United States Patent
Ladd et al.

(10) Patent No.: US 8,341,273 B2
(45) Date of Patent: *Dec. 25, 2012

(54) DEFERRED INVOCATION OF COMMUNICATION SERVICES

(75) Inventors: David Ladd, Lisle, IL (US); Narasimha R. Rachumallu, Parsippany, NJ (US); Aeryung Moon, Warren, NJ (US); Leo Nieuwesteeg, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/179,693

(22) Filed: Jul. 11, 2011

(65) Prior Publication Data

US 2011/0270997 A1 Nov. 3, 2011

Related U.S. Application Data

(63) Continuation of application No. 11/745,781, filed on May 8, 2007, now Pat. No. 7,979,523.

(51) Int. Cl.
G06F 15/16 (2006.01)
G06F 15/173 (2006.01)
H04L 12/16 (2006.01)

(52) U.S. Cl. .................. 709/227; 709/223; 370/260

(58) Field of Classification Search .................. None
See application file for complete search history.

(56) References Cited

U.S. PATENT DOCUMENTS

| | | | |
|---|---|---|---|
| 6,988,126 B2 | 1/2006 | Wilcock et al. | |
| 7,000,019 B2 | 2/2006 | Low et al. | |
| 7,334,017 B2 | 2/2008 | Hawkes et al. | |
| 7,463,619 B1 | 12/2008 | Prokop et al. | |
| 7,475,140 B2 * | 1/2009 | Requena | 709/225 |
| 7,496,672 B2 | 2/2009 | Orton et al. | |
| 7,630,328 B2 | 12/2009 | Wright et al. | |
| 7,664,097 B2 | 2/2010 | White et al. | |
| 7,761,600 B2 * | 7/2010 | Terrill et al. | 709/245 |
| 7,792,275 B2 | 9/2010 | Tai et al. | |
| 7,856,226 B2 * | 12/2010 | Wong et al. | 455/414.1 |
| 8,042,118 B2 * | 10/2011 | Gilfix et al. | 719/311 |
| 2002/0010771 A1 | 1/2002 | Mandato | |
| 2002/0073210 A1 | 6/2002 | Low et al. | |
| 2003/0231741 A1 | 12/2003 | Rancu et al. | |

(Continued)

OTHER PUBLICATIONS

"CR to Rel-5 WI 'IMS-CCR'" 3GPP TSG CN Meeting #27, Mar. 9-11, 2005, Tokyo, Japan, 66 pages.

*Primary Examiner* — Ranodhi Serrao
*Assistant Examiner* — Muktesh G Gupta
(74) *Attorney, Agent, or Firm* — Fish & Richardson P.C.

(57) ABSTRACT

In one embodiment, a network device determines one or more conditions for invoking one or more real applications to the network device for a session. This determination may be made at the initiation of the session, such as when a SIP INVITE message is received. The one or more conditions allow real applications to be invoked when a future event satisfies the condition. When it is determined that a condition is satisfied, a real application associated with the condition is then invoked. Accordingly, conditions may be set for real applications that may be tested against future events that have not yet occurred. This allows deferred invocation of real applications. Accordingly, if real applications are not needed for a session, then they are not invoked. But, when a real application is needed, it can be invoked.

21 Claims, 3 Drawing Sheets

U.S. PATENT DOCUMENTS

| | | |
|---|---|---|
| 2007/0086582 A1 | 4/2007 | Tai et al. |
| 2007/0088836 A1 | 4/2007 | Tai et al. |
| 2007/0100981 A1* | 5/2007 | Adamczyk et al. ........... 709/223 |
| 2007/0192465 A1* | 8/2007 | Modarressi ................... 709/223 |
| 2007/0201665 A1 | 8/2007 | Kocan et al. |
| 2008/0082643 A1* | 4/2008 | Storrie et al. ................. 709/223 |
| 2008/0162637 A1 | 7/2008 | Adamczyk et al. |
| 2008/0205267 A1 | 8/2008 | El Barachi et al. |
| 2009/0122794 A1 | 5/2009 | Wu et al. |
| 2010/0211666 A1 | 8/2010 | Kvernvik et al. |

* cited by examiner

DEFERRED INVOCATION OF COMMUNICATION SERVICES

CROSS-REFERENCE TO RELATED APPLICATIONS

This application is a continuation application of and claims priority to U.S. application Ser. No. 11/745,781, filed on May 8, 2007, which is incorporated by reference herein in its entirety.

TECHNICAL FIELD

Particular embodiments generally relate to telephony.

BACKGROUND

In the 3GPP Internet protocol (IP) multimedia subsystem (IMS), a serving call session control function (S-CSCF) controls the invocation of telephony features by selectively invoking the features as part of the session initiation. To invoke a given feature, the S-CSCF constructs and sends a session initiation protocol (SIP) message to an external server that provides the feature. The application on the server then processes the message to provide the feature. For example, the application may act as a proxy and send the request back to the S-CSCF for future processing, act as a forking proxy initiating new call legs, act as a back-to-back user agent initiating a related but technically new call attempt, or send a final response that denies the call attempt. This involves a number of messages that may have to be sent. As the overall number of features implemented in a network grows, the number of SIP messages involved in initiating calls grows.

The S-CSCF will always invoke a number of features when the call is initiated. For example, for a certain subscriber or class of subscribers, a set number of features are invoked. However, the number of applications that may actually need to be used on the call may be less than the number of applications that are invoked. There is no way of knowing which applications will be needed as the session progresses; thus, all the applications that may possibly be needed are invoked initially at the beginning of the session. This may result in unused applications and unnecessary messaging that is performed to invoke the applications.

DESCRIPTION OF EXAMPLE EMBODIMENTS

Overview

In one embodiment, a network device determines one or more conditions for invoking one or more real applications to the network device for a session. This determination may be made at the initiation of the session, such as when a SIP INVITE message is received. The one or more conditions allow real applications to be invoked when a future event satisfies the condition. When it is determined that a condition is satisfied, a real application associated with the condition is then invoked. Accordingly, conditions may be set for real applications that may be tested against future events that have not yet occurred. This allows deferred invocation of real applications. Accordingly, if real applications are not needed for a session, then they are not invoked. But, when a real application is needed, it can be invoked.

Example Embodiments

Figure 1:
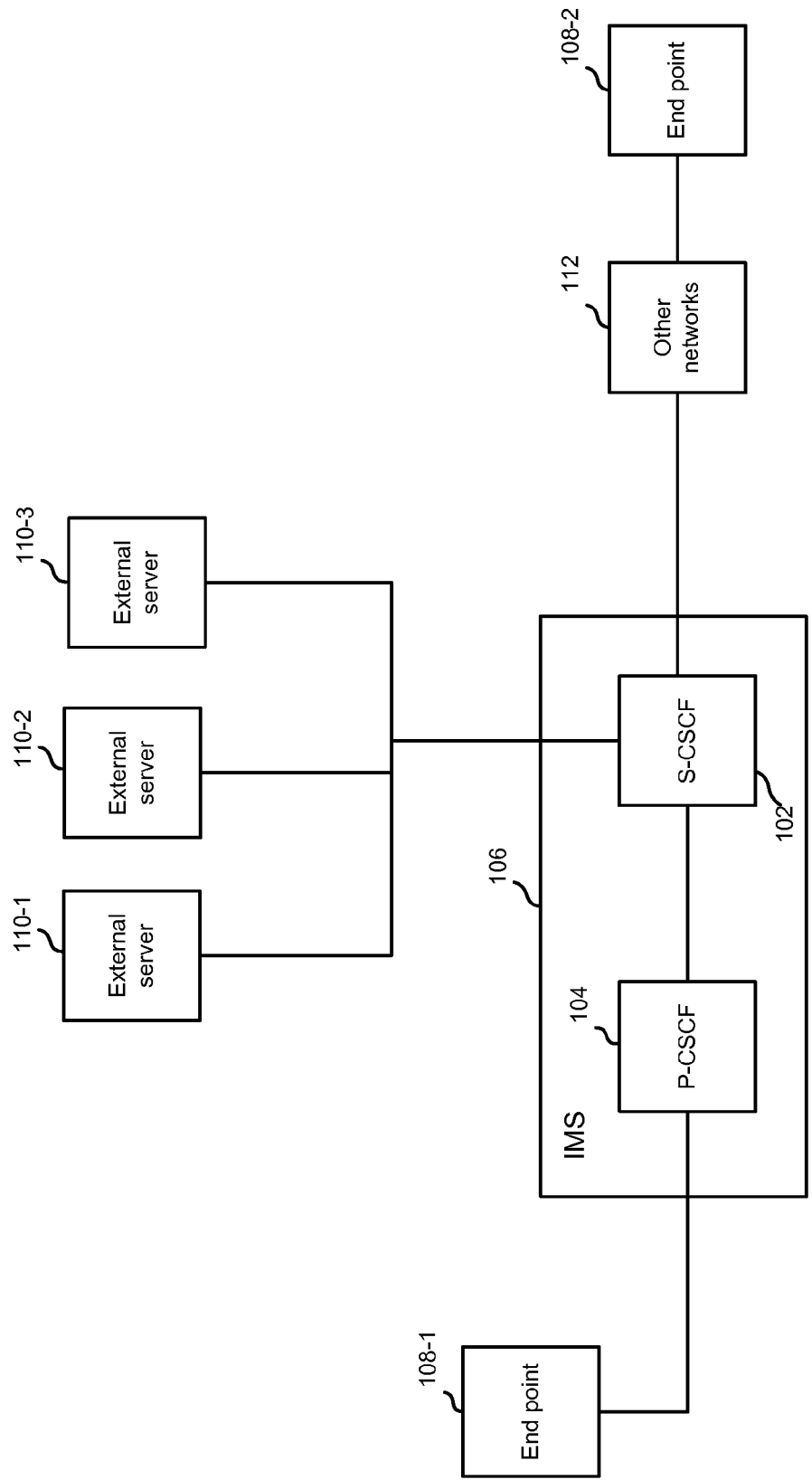
FIG. 1 depicts an example of a system for providing deferred invocation of real applications.

FIG. 1 depicts an example of a system for providing deferred invocation of real applications. An IMS compliant network 106 is described for discussion purposes; however, it will be understood that other embodiments may not include an IMS infrastructure. Also, the system includes end points 108, servers 110, and other networks 112.

As shown, IMS 106 includes a proxy-control session control function (P-CSCF) 104 and a serving-control session control function (S-CSCF) 102. Other components of IMS 106 may be appreciated by a person skilled in the art but are not described.

P-CSCF 104 is a SIP proxy that is the first point of contact for end points 108. P-CSCF 104, as it is known in the art, sits in the path of signaling messages and can provide authentication for end point 108.

S-CSCF 102 sits in the signaling plane and may be a SIP server. S-CSCF 102 may provide session control for a session with end points 108. S-CSCF 102 may be a function provided on a network device in IMS 106.

Other network devices 112 and end points 108 may be participating in a voice call with end point 108-1. In one example, end point 108-1 may make a call to end point 108-2. When a call is made, a session may be established for the call. Although a voice call is described, it will be understood that a session may include any communication. For example, a session may include a streaming video session, instant messaging session, voice call, etc. Also, two end points need not be on a voice call. Rather, end point 108-1 may be a device receiving streaming video from an application on end point 108-2.

Servers 110 may provide features for a session. For example, servers 110 may be application or feature server. To provide the features, servers 110 need to be contacted to invoke the application.

Particular embodiments provide a deferred invocation of real applications on servers 110. For example, S-CSCF 102 may include one or more conditions for invoking real applications for a session. Thus, a session may be initiated and conditions for real applications may be set. The conditions may be triggered when a future event occurs. Thus, as the session proceeds, it is determined if one of these conditions is met. If a condition is met, then the real application associated with the condition may be invoked. At this point, S-CSCF 102 may send a message to external server 110 to invoke the application. Then, messaging may be performed to invoke the application to perform the feature. Conventionally, S-CSCF 102 would invoke all real applications that were specified for a session. For example, there was no choice as to which real applications could be invoked at a later time. Rather, all the real applications specified by initial filter criteria were invoked when the session was initiated. However, in contrast, particular embodiments provide a method for specifying deferred invocation of real applications. Thus, messaging to invoke applications is avoided until the application is actually needed. This prevents unnecessary messaging.

Figure 2:
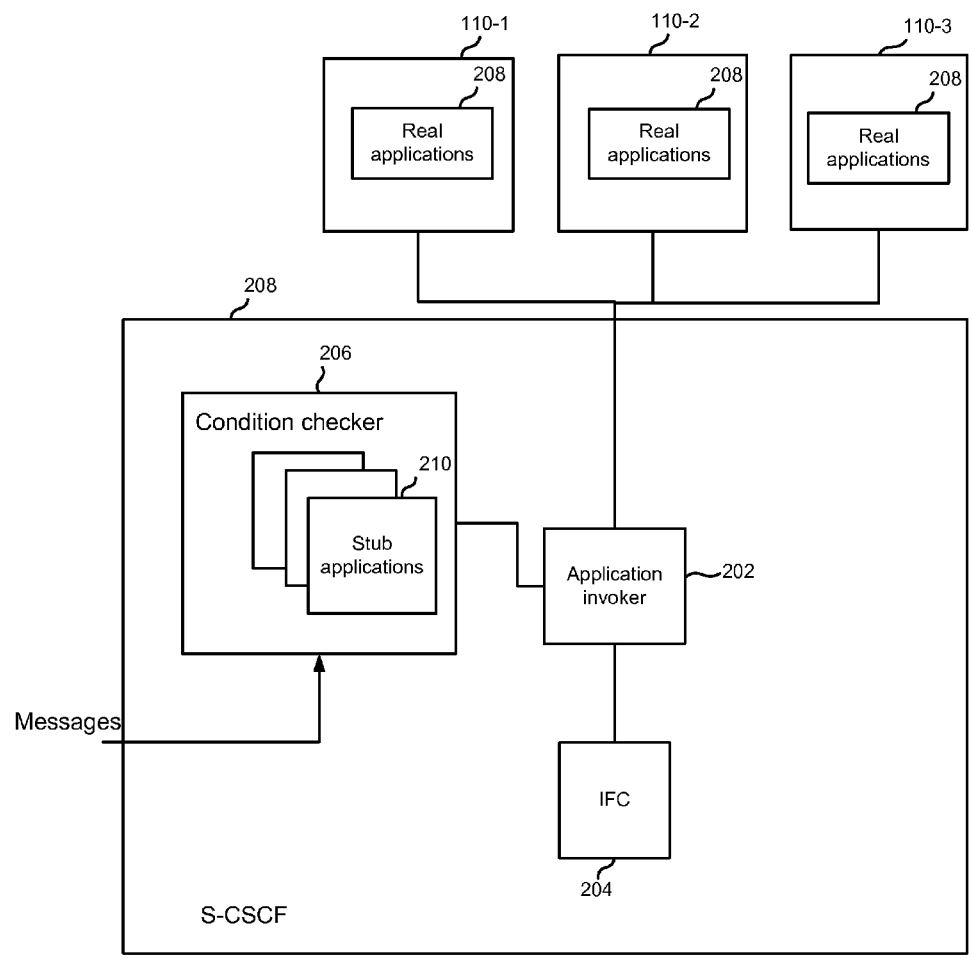
FIG. 2 depicts a more detailed embodiment of a S-CSCF.

FIG. 2 depicts a more detailed embodiment of S-CSCF 102. S-CSCF 102 includes an application invoker 202, an initial filter criteria (IFC) 204, a condition tracker 206, real applications 208, and stub applications 210.

Application invoker 202 is configured to invoke applications. For example, application invoker 202 may invoke real applications 208 and stub applications 210. Real applications 208 may be any applications that are configured to provide a feature or service to S-CSCF 102. For example, real applications 208 may be external applications to S-CSCF 102. Also, real applications 208 may be internal to S-CSCF 208. Although real applications 208 are shown as being on servers 110, it will be understood they may reside anywhere.

Stub applications 210 may be any logic that can check to see if conditions are met. For example, stub applications may be small segments of SIP application logic that can perform a limited set of operations in a manner similar to real applications 208. However, the logic is substantially more efficient in that the full features do not need to be provided by stub applications 210. Rather, stub applications 210 check to see if conditions are met before the real application invocation is performed. A stub application may not be the real application. For example, the stub application is not able to provide the full feature or service of the real application. Rather, the stub application may be similar to the real application but may test whether a condition is met and then cause the real application to be invoked to provide the feature or service. Stub application 210 is shown as being internal to S-CSCF 102 but stub application 210 may be found anywhere, such as external to S-CSCF 102.

Initial filter criteria 204 may be specified by a user. The initial filter criteria may be an extensible mark-up language (XML) dialect that filters feature invocations according to specific testable facts about the session that are reflected in a SIP message. The initial filter criteria allows users to specify what order and under what conditions various real applications 208 in the network are to be invoked during a session initiation. For example, the condition for invoking a feature is a Boolean combination of primitive tests, which may be referred to as service point triggers (SPTs). The initial filter criteria are extended to test non-initial conditions. That is, events that may occur after initial invocation of real applications are tested to see if they invoke the initial filter criteria, and thus a real application.

Initial filter criteria 204 may include deferred evaluation SPTs that are tests of future events. The future events may be any events that occur after the initial filter criteria 204 is read and evaluated for the session. For example, initial filter criteria 204 may be evaluated against the session initiating message to determine which criteria are satisfied. The events may be based on messages that are received, time-outs, etc. When a session is initiated, such as when a SIP INVITE message is received, then the initial filter criteria 204 may be tested to see which real applications 208 may be needed for the session. Some of these real applications 208 may be invoked initially and some may not be invoked right away. The deferred evaluation SPTs allow deferred invocation of real applications 208.

Application invoker 202 thus processes a list of initial filter criteria for the session. For example, different sessions or call attempts may be associated with different lists of initial filter criteria. For example, an instant messaging session may have a list of initial filter criteria and a voice over Internet Protocol (VoIP) telephone call may have a second list of initial filter criteria.

For each initial filter criteria in the list, it is determined whether deferred invocation or initial invocation should be performed. For example, if a condition for a future event is provided with the filter criteria, then a stub application 210 may be invoked. If a condition for a future event is not provided, then the real application 208 may be invoked initially.

Thus, application invoker 202 may invoke the real applications that should be invoked initially. In this case, application invoker 202 may communicate with servers 110 to invoke the application to provide the feature.

Application invoker 202 may also invoke one or more stub applications 210. As the session set-up proceeds, different messages or time-outs may occur. Condition checker 206 checks whether the conditions for stub applications 210 are met. Stub applications 210 evaluate the conditions and if a condition is met, then a real application 208 is invoked that is associated with the condition. For example, application invoker 202 may be contacted and the application is invoked. Accordingly, it is expected that the condition corresponds to a future event that may indicate a real application is needed. Accordingly, when that future event occurs, the real application that may be needed is invoked.

Figure 3:
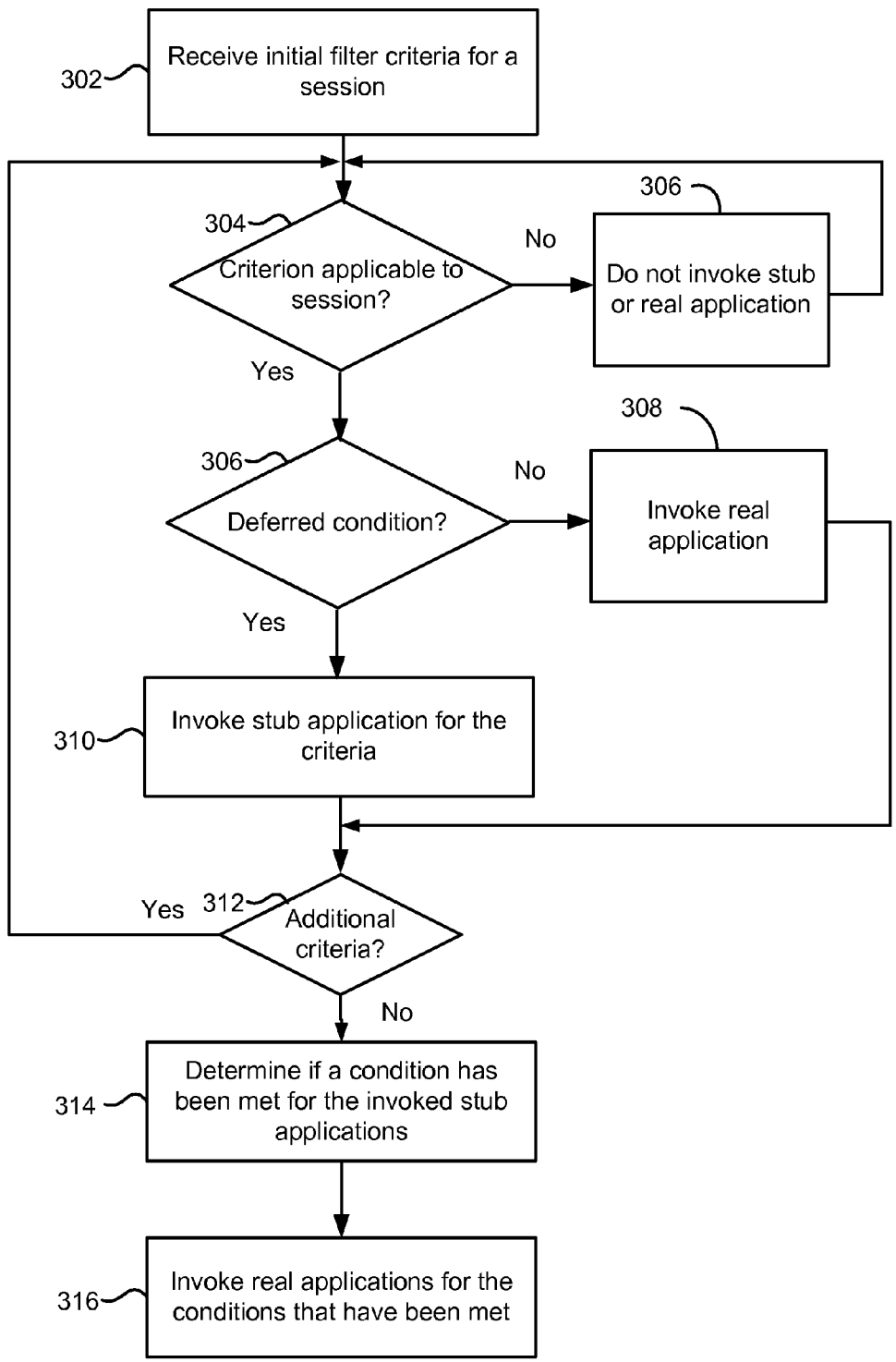
FIG. 3 depicts a simplified flowchart of a method for providing deferred invocation of real applications.

FIG. 3 depicts a simplified flowchart of a method for providing deferred invocation of real applications. Step 302 receives initial filter criteria for a session. Step 304 then determines if a filter criterion is applicable for a session. For example, the initial filter criterion is tested against a session initiating message to determine if it is applicable for the session. If not, step 306 does not invoke an internal or real application.

However, if the initial filter criterion is application, step 308 determines if the initial filter criterion includes deferred conditions. For example, application invoker 202 may split the initial criteria list into two lists. One list may include a list for deferred invocation and another list is for initial invocation. If the criterion does not include deferred conditions, then step 308 invokes a real application 208 as described above. The process then proceeds to step 312.

If deferred conditions are included, step 310 invokes stub application 210 for the criterion. Step 312 then determines if there are more criteria in the initial filter criteria. If so, the process reiterates to step 304.

If there are no more criteria to process, step 314 then determines if a condition has been met. For example, the conditions may be simple tests, such as conditionals of SIP message="value". A specific example is SIP response code="486". This conditional may be triggered when a 486 SIP message is received indicating that end point 108 is busy. Thus, an application is only called when a busy response is received. In this example, the real application may be needed to fork another leg to a voicemail server for the call. Also, the real application may never be invoked. For example, an instant message logging application might only care about SIP MESSAGE methods. Thus, if a SIP MESSAGE method is not sent, then the instant messaging logging application does not need to be invoked. Further, a timer may be set such that when it expires, then a condition is met. Thus, a real application 208 may then be invoked after a certain time period.

Step 316 then invokes real applications 208 for the conditions that have been met. Thus, conditions that are not met during the session set-up are not invoked. Accordingly, the resources that are used for application invocation are avoided.

Accordingly, a user may insert tests in initial filter criteria that are triggered by future events. Certain messages, time-outs, or any other information may be associated with these conditions for application invocations. This allows for saving of resources that do not need to be invoked for a session.

Although the description has been described with respect to particular embodiments thereof, these particular embodiments are merely illustrative, and not restrictive. Although SIP is described, it will be understood that other protocols may be used. Further, it will be understood that an IMS infrastructure does not need to be used.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory.

Particular embodiments can be implemented in the form of control logic in software or hardware or a combination of both. The control logic, when executed by one or more processors, may be operable to perform that which is described in particular embodiments.

A "processor" or "process" includes any human, hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method comprising:
   receiving a feature invocation list associated with a session between two end devices;
   determining, during initiation of the session, whether the feature invocation list is applicable for the session;
   responsive to determining that the feature invocation list is applicable for the session, examining the feature invocation list;
   determining whether the feature invocation list includes at least one first criterion for invocation of a first real application at a time of initiation of the session;
   determining whether the feature invocation list includes at least one second criterion for invocation of a second real application at a time that is after the time of initiation of the session;
   responsive to determining that the feature invocation list includes the at least one first criterion, invoking the first real application at the time of initiation of the session; and
   responsive to determining that the feature invocation list includes the at least one second criterion:
      invoking a stub application at the time of initiation of the session, wherein the stub application is associated with the second real application and includes a subset of features and services of the second real application, and performs a limited set of operations corresponding to the second real application, the stub application being configured to test a condition for invocation of the second real application;
      determining, using the stub application and during execution of the session, whether a condition is met for invocation of the second real application; and
      responsive to determining that the condition is met, invoking the second real application.

2. The method of claim 1, wherein the feature invocation list includes information specifying an order of invocation of real applications during session initiation, and a set of conditions that are to be met for invocation of the real applications.

3. The method of claim 2, wherein a condition for invocation of a real application is a service point trigger (SPT), wherein an SPT is a Boolean combination of primitive tests.

4. The method of claim 3, wherein the feature invocation list includes deferred evaluation SPTs, wherein a deferred evaluation SPT is a condition that is satisfied by an occurrence of a future event at a time after the time of the session initiation.

5. The method of claim 1, wherein the second real application is invoked only when the condition is met.

6. The method of claim 1, wherein the condition is associated with a time-out event of a time period, wherein the second real application is invoked upon occurrence of the time-out event.

7. The method of claim 1, wherein examining the feature invocation list further includes examining the feature invocation list after a SIP INVITE message is sent.

8. The method of claim 1, wherein the feature invocation list is written in an extensible mark-up language (XML), the feature invocation list being written by an user.

9. The method of claim 1, wherein the method is performed at a network device.

10. The method of claim 9, wherein the network device is a SIP server.

11. The method of claim 9, wherein at least one of the first real application and the second real application is present in a location that is distinct from the network device.

12. An apparatus comprising:
   a processor;
   an initial filter criteria providing a feature invocation list that includes information specifying an order of invocation of real applications during initiation of a session between two end devices, and a set of conditions that are to be met for invocation of real applications during the session, wherein the feature invocation list is configured by an user;
   at least one real application that is configured to provide a feature or a service to the apparatus;
   at least one stub application that is associated with a real application and configured to include a subset of features and services of the associated real application and perform a limited set of operations in a manner similar to the associated real application, the at least one stub application further configured to test a condition for invocation of the associated real application;
   a first module including one or more instructions encoded in a non-transitory machine readable medium for execution by the processor and when executed cause the processor to perform functions including:
      receiving a feature invocation list associated with a session between two end devices;
      determining, during initiation of the session, whether the feature invocation list is applicable for the session;
      responsive to determining that the feature invocation list is applicable for the session, examining the feature invocation list;
      determining whether the feature invocation list includes at least one first criterion for invocation of a first real application at a time of initiation of the session;
      determining whether the feature invocation list includes at least one second criterion for invocation of a second real application at a time that is after the time of initiation of the session;
      responsive to determining that the feature invocation list includes the at least one first criterion, invoking the first real application at the time of initiation of the session; and
      responsive to determining that the feature invocation list includes the at least one second criterion:
         invoking a stub application at the time of initiation of the session, wherein the stub application is associated with the second real application and includes a subset of features and services of the second real application, and performs a limited set of operations corresponding to the second real application, the stub application being configured to test a condition for invocation of the second real application; and
         responsive to receiving information that a condition is met for invocation of the second real application, invoking the second real application; and
   a second module including one or more instructions encoded in a non-transitory machine readable medium for execution by the processor and when executed cause the processor to perform functions including:
      determining, during execution of a session between two end points and using a stub application that is invoked for the session, whether a condition is met for invocation of a real application that is associated with the stub application; and
      based on determining that the condition is met, sending an information to the first module.

13. The apparatus of claim 12, wherein the apparatus includes a serving call session control function (S-CSCF) associated with a 3GPP Internet Protocol (IP) multimedia subsystem (IMS).

14. The apparatus of claim 13, wherein the apparatus includes a session initiation protocol (SIP) server.

15. The apparatus of claim 12, wherein the set of conditions that are to be met for invocation of real applications include at least one service point trigger (SPT), wherein an SPT is a Boolean combination of primitive tests.

16. The apparatus of claim 15, wherein the feature invocation list includes at least one deferred evaluation SPT, wherein a deferred evaluation SPT is a condition that is satisfied by an occurrence of a future event at a time that is after the time of initiation of the session.

17. The apparatus of claim 12, wherein the one or more instructions included in the first module cause the processor to further perform functions including:
examining the feature invocation list after a SIP INVITE message is sent for initiation of the session.

18. The apparatus of claim 12, wherein the one or more instructions included in the second module cause the processor to further perform functions including:
determining whether a time-out event of a time period has occurred; and
based on determining that a time-out event of a time period has occurred, determining that the condition is met for invocation of a real application that is associated with the stub application.

19. The apparatus of claim 12, wherein the feature invocation list is written in an extensible mark-up language (XML).

20. A system in a network, the system comprising:
at least two end devices that are configured to engage in a IP telephony session;
a first network device that is configured to act as a proxy for at least one end device for establishing an IP telephony session;
at least one server including at least one real application that is configured to provide a feature for a IP telephony session;
a second network device including one or more instructions encoded in a non-transitory machine readable medium for execution by a processor and when executed cause the processor to perform functions including:
receiving a feature invocation list associated with a session between the at least two end devices;
determining, during initiation of the session, whether the feature invocation list is applicable for the session;
responsive to determining that the feature invocation list is applicable for the session, examining the feature invocation list;
determining whether the feature invocation list includes at least one first criterion for invocation of a first real application at a time of initiation of the session;
determining whether the feature invocation list includes at least one second criterion for invocation of a second real application at a time that is after the time of initiation of the session;
responsive to determining that the feature invocation list includes the at least one first criterion, invoking the first real application at the time of initiation of the session; and
responsive to determining that the feature invocation list includes the at least one second criterion:
invoking a stub application at the time of initiation of the session, wherein the stub application is associated with the second real application and includes a subset of features and services of the second real application, and performs a limited set of operations corresponding to the second real application, the stub application being configured to test a condition for invocation of the second real application;
determining, using the stub application and during execution of the session, whether a condition is met for invocation of the second real application; and
responsive to determining that the condition is met, invoking the second real application.

21. A non-transitory machine-readable medium, the medium comprising:
one or more instructions for execution by a processor and when executed cause the processor to perform functions including:
receiving a feature invocation list associated with a session between two end devices;
determining, during initiation of the session, whether the feature invocation list is applicable for the session;
responsive to determining that the feature invocation list is applicable for the session, examining the feature invocation list;
determining whether the feature invocation list includes at least one first criterion for invocation of a first real application at a time of initiation of the session;
determining whether the feature invocation list includes at least one second criterion for invocation of a second real application at a time that is after the time of initiation of the session;
responsive to determining that the feature invocation list includes the at least one first criterion, invoking the first real application at the time of initiation of the session; and
responsive to determining that the feature invocation list includes the at least one second criterion:
invoking a stub application at the time of initiation of the session, wherein the stub application is associated with the second real application and includes a subset of features and services of the second real application, and performs a limited set of operations corresponding to the second real application, the stub application being configured to test a condition for invocation of the second real application;
determining, using the stub application and during execution of the session, whether a condition is met for invocation of the second real application; and
responsive to determining that the condition is met, invoking the second real application.

* * * * *